(12) United States Patent
Woellner Duarte Pereira et al.

(10) Patent No.: US 11,872,745 B2
(45) Date of Patent: Jan. 16, 2024

(54) SYSTEMS AND METHODS FOR IMPROVED DISPENSING, LAYERING, AND DEPOSITION OF CROSS-LINKABLE HYDROGELS

(71) Applicant: 3D SYSTEMS, INC., Rock Hill, SC (US)

(72) Inventors: Taciana Leticia Woellner Duarte Pereira, Philadelphia, PA (US); Ricardo Solorzano, Garnet Valley, PA (US); Gabriel David Montoya, Philadelphia, PA (US); Margaret Elizabeth Prendergast, Philadelphia, PA (US)

(73) Assignee: 3D SYSTEMS, INC., Rock Hill, SC (US)

( * ) Notice: Subject to any disclaimer, the term of this patent is extended or adjusted under 35 U.S.C. 154(b) by 269 days.

(21) Appl. No.: 16/450,610

(22) Filed: Jun. 24, 2019

(65) Prior Publication Data

US 2019/0389124 A1 Dec. 26, 2019

Related U.S. Application Data

(60) Provisional application No. 62/688,668, filed on Jun. 22, 2018, provisional application No. 62/690,730, filed on Jun. 27, 2018.

(51) Int. Cl.
*B29C 64/112* (2017.01)
*B33Y 10/00* (2015.01)
(Continued)

(52) U.S. Cl.
CPC ............ *B29C 64/112* (2017.08); *B29B 13/08* (2013.01); *B29C 64/245* (2017.08);
(Continued)

(58) Field of Classification Search
CPC ... B29C 64/112; B29C 64/314; B29C 64/245; B33Y 30/00; B33Y 40/00; B33Y 70/00;
(Continued)

(56) References Cited

U.S. PATENT DOCUMENTS

| 4,412,096 A | 10/1983 | Edgerton et al. |
|---|---|---|
| 8,639,484 B2 | 1/2014 | Wei et al. |

(Continued)

FOREIGN PATENT DOCUMENTS

| CN | 107868260 A | 4/2018 |
|---|---|---|
| GB | 201722186 | 7/2019 |

(Continued)

OTHER PUBLICATIONS

Cassano et al. ("Using airbrushes to pattern reagents for microarrays and paper-fluidic devices" Microsystems & Nanoengineering 3: 17055 (2017)).*

(Continued)

*Primary Examiner* — Larry W Thrower
(74) *Attorney, Agent, or Firm* — DLA Piper LLP US

(57) ABSTRACT

Systems and methods for the dispensing of liquid, and automated layering of liquid hydrogel patterns are disclosed. In some embodiments, the systems and methods described herein may utilize a bioprinter having a brush that is configured to pattern a collagen layer. In some embodiments, the bioprinter may be used to make layered bioprinted materials. In some embodiments, the systems and methods described herein may include a bioprinter having an atomizer needle that is configured to dispense liquid in an automated way. In some embodiments, the disclosed systems and methods may provide modified surfaces upon which materials may be printed using a three-dimensional (Continued)

(3D) bioprinter. In one embodiment, a modified surface may be formed of polydimethylsiloxane (PDMS), silicones and the like.

8 Claims, 25 Drawing Sheets

(51) Int. Cl.
    *B33Y 30/00* (2015.01)
    *B33Y 70/00* (2020.01)
    *B29C 64/245* (2017.01)
    *B29C 64/314* (2017.01)
    *B29B 13/08* (2006.01)
    *B33Y 40/10* (2020.01)
    *B29K 83/00* (2006.01)
    *B33Y 80/00* (2015.01)
    *B29L 31/40* (2006.01)
    *B29K 105/00* (2006.01)

(52) U.S. Cl.
    CPC ............ *B29C 64/314* (2017.08); *B33Y 10/00* (2014.12); *B33Y 30/00* (2014.12); *B33Y 40/10* (2020.01); *B33Y 70/00* (2014.12); *B29K 2083/00* (2013.01); *B29K 2105/0061* (2013.01); *B29L 2031/40* (2013.01); *B33Y 80/00* (2014.12)

(58) Field of Classification Search
    CPC ..... B33Y 80/00; B29B 13/08; B29K 2083/00; B29K 2105/0061; B29L 2031/40
    See application file for complete search history.

(56) References Cited

U.S. PATENT DOCUMENTS

| | | | |
|---|---|---|---|
| 9,068,155 | B2 | 6/2015 | Allbritton et al. |
| 2008/0193536 | A1 | 8/2008 | Khademhosseini et al. |
| 2011/0212501 | A1 | 9/2011 | Yoo |
| 2014/0342394 | A1 | 11/2014 | Parker et al. |
| 2015/0037445 | A1* | 2/2015 | Murphy ................ B29C 64/106 425/131.1 |
| 2017/0259498 | A1* | 9/2017 | Stevens ................ B29C 64/106 |

FOREIGN PATENT DOCUMENTS

| | | |
|---|---|---|
| PT | 104247 B | 4/2009 |
| WO | 2006135258 A1 | 12/2016 |

OTHER PUBLICATIONS

International Search Report issued in PCT/US19/38742 dated Sep. 10, 2019.
Written Opinion issued in PCT/US19/38742 dated Sep. 10, 2019.
Klasner et al., "Synthesis and Characterization of a Poly(dimethylsiloxane)-Poly(ethylene oxide) Block Copolymer for Fabrication of Amphiphilic Surfaces on Microfluidic Devices", Langmuir, vol. 25, No. 17, pp. 10390-10396, Jul. 2, 2019.
Dow, "Sylgard 184 Silicone Elastomer", Retrieved from the Internet: <URL: https://consumer.dow.com/content/dam/dcc/documents/en-us/productdatasheet/11/11-31/11-3184-sylgard-184-elastomer.pdf?iframe=true>, (2017).

* cited by examiner

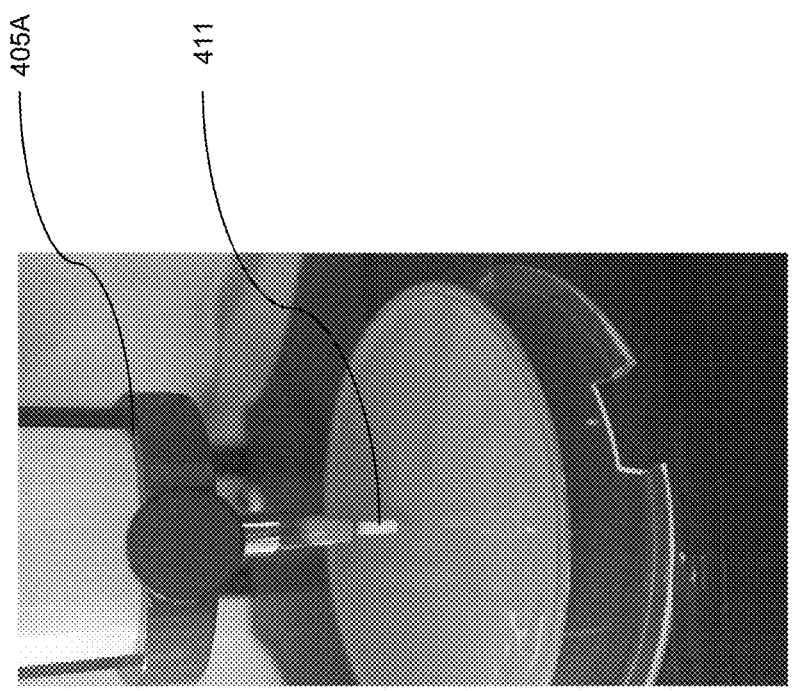

SYSTEMS AND METHODS FOR IMPROVED DISPENSING, LAYERING, AND DEPOSITION OF CROSS-LINKABLE HYDROGELS

CROSS REFERENCE TO RELATED APPLICATIONS

The present disclosure claims priority to and the benefit of U.S. Provisional Application No. 62/688,668, entitled "SYSTEMS AND METHODS FOR THE AUTOMATED DISPENSING OF LIQUID AND AUTOMATED LAYERING OF LIQUID HYDROGEL PATTERNS USING A BIOPRINTER" filed on Jun. 22, 2018, and U.S. Provisional Application No. 62/690,730, entitled "MODIFIED SURFACES FOR 3D BIOPRINTING" filed on Jun. 27, 2018, the contents of both of which are hereby incorporated by reference in their entirety.

Further, the present disclosure is related to U.S. application Ser. No. 15/128,632 entitled "Methods, devices, and systems for the fabrication of materials and tissues utilizing electromagnetic radiation," and U.S. application Ser. No. 15/945,435 entitled "Multi-headed auto-calibrating bioprinter with heads that heat, cool, and crosslink," the contents of both of which are hereby incorporated by reference, in their entirety.

TECHNICAL FIELD

The present disclosure is directed towards three-dimensional (3D) printing of biological structures.

BACKGROUND

Three-dimensional (3D) printing of biological structures has been used to print biological tissue, organs and the like.

However conventional methods for 3D printing face challenges when creating layered biological structures (e.g., tissues) and dispensing liquid (e.g., tissue culture media, cell culture media, a curing solution) in an automated manner.

For example, in conventional systems, after a tissue construct is printed using a 3D printer, a liquid (e.g., media, curing agent, etc.) may be layered on top of the tissue construct. However, conventional methods for layering the liquid may include approaches such as manual dispersion by hand pipetting, which are both tedious and time consuming. Additionally, conventional methods for layering liquid on top of the tissue construct may include using conical and straight needle tips, which may cause liquid to be ejected from a syringe in such a manner that the tissue construct is splashed and/or damaged.

Additionally, conventional surfaces may cause poor adherence between the printed materials (e.g., biological structures, biological tissues, biological organs, and the like) and the surface the materials are printed on, thereby preventing 3D structure formation. Alternatively, conventional surfaces may have too much adhesion between the printed materials and the surface, such that the printed material cannot be removed from the surface without causing damage to the printed materials. For example, in conventional systems, bioprinted materials are printed onto petri dishes and wells that are composed of glass, polyethylene, polystyrene and the like. Bioprinted materials may adhere to the surfaces of the petri dishes and wells. Accordingly, the bioprinted materials may need to be manually removed from the surface using razor blades and/or tweezers. However, the use of razor blades and/or tweezers may damage the bioprinted materials.

SUMMARY

The present disclosure is directed towards systems and methods for the improved dispensing, layering and deposition of materials for bioprinting.

In some embodiments, the disclosed systems and methods may provide techniques, and equipment related to the automated dispensing of liquid and the automated layering of liquid hydrogel patterns. In some embodiments, the systems and methods described herein may utilize a bioprinter having a brush that is configured to pattern a collagen layer. In some embodiments, the bioprinter may be used to make layered bioprinted materials.

In some embodiments, the systems and methods described herein may include a bioprinter having an atomizer needle that is configured to dispense liquid in an automated way, thereby providing benefits for the efficient creation of tissue.

In some embodiments, the disclosed systems and methods may provide modified surfaces upon which materials may be printed using a three-dimensional (3D) bioprinter. In one embodiment, a modified surface such as sandpaper may be optimized for the printing of granular materials. In another embodiment, a modified surface such as flexible silicone rubber may be optimized for the printing of materials having high melting temperatures.

In one embodiment, a modified surface may be formed of polydimethylsiloxane (PDMS), silicones and the like.

In some embodiments, the disclosed systems and methods may include a method for constructing hydrogel objects. This may include the steps of providing a hydrophobic surface, dispensing cross-linkable hydrogel onto the hydrophobic surface, generating a hydrogel object by curing the dispensed cross-linkable hydrogel by applying at least one of a light, heat, or a crosslinker, and adding media to the generated hydrogel object. Providing a hydrophobic surface may also include mixing a first component comprising at least one of 2-component room temperature vulcanizing silicone, vinyl, methyl modified silica in poly(dimethylsiloxane) and a second component comprising hydride functional crosslinker to form a mixture in a well of a receiving plate, curing the mixture at a first setting, and curing the mixture at a second setting.

The method for constructing a surface for receiving three-dimensional bio-printed objects may include the step of sterilizing the mixture with at least one of gamma or ultraviolet radiation. In some embodiments, this may include applying radiation at 365 nm for 2 hours. The receiving plate may be formed of at least one of glass, polystyrene, and polypropylene. The mixture may have a height about 20 to about 200 μm within the well.

The method for constructing the surface may include a first setting including applying a shaker at 37 degrees Celsius for 2 hours. The method for constructing the surface may also include a second setting including applying an oven at 60 degrees Celsius for 3 hours.

In some embodiments, a system for printing biological materials includes a bioprinter communicatively coupled to a processor and non-transitory memory comprising instructions to control the operation of the bioprinter. The bioprinter may include a cartridge configured to store a material, a modified surface configured to receive a deposited material, the modified surface comprising a polydimethylsiloxane (PDMS) coating, and a dispensing mechanism coupled to the cartridge configured to dispense the material onto the modified surface. The PDMS coating may have a thickness between about 20 to about 200 μm. The modified surface may be positioned within a bottom surface of a well of a receiving plate. The receiving plate may be formed of at least one of glass, polystyrene, and polypropylene. In some embodiments the PDMS coating includes at least one of nanoparticle surface modifications, dynamic surfactant treatments, plasma coatings, graft polymer coatings and hydrolyzation surface modifications. The material deposited on the modified surface may include a hydrogel. The material may also include at least one of collagen, hyaluronic acid, gelatin, fibrin, nanocellulose, alginate, polyethylene glycol (PEG), chitosan, and pluronic. In some embodiments, the material may be cell-laden. In other embodiments, the material may not include cells. In some embodiments, the modified surface may be sterile. In some embodiments, the bioprinter may be further configured to print a cancer tissue model.

In some embodiments a surface for receiving three-dimensional bioprinted objects may include a polydimethylsiloxane (PDMS) coating positioned within a bottom surface of a well of a receiving plate, the PDMS coating having a flat top surface and a height between about 20 to 200 μm. In such an embodiment the receiving plate may include at least one of glass, polystyrene, and polypropylene. In some embodiments the PDMS coating includes at least one of nanoparticle surface modifications, dynamic surfactant treatments, plasma coatings, graft polymer coatings and hydrolyzation surface modifications.

BRIEF DESCRIPTION OF THE DRAWINGS

The accompanying drawings, which are incorporated in and constitute a part of this specification, illustrate several embodiments and, together with the description, serve to explain the disclosed principles. In the drawings:

FIG. 4F provides an illustration of systems and methods for constructing a three-dimensional biological structure, in accordance with some embodiments of the present disclosure.

DETAILED DESCRIPTION

The present disclosure is directed towards systems and methods associated with a three-dimensional bioprinter capable of fabricating cellular constructs such as tissues and organs. "Bioprinting" or "printing" as used herein may refer to a three-dimensional, precise deposition of cells and/or other substances and materials using an automated, computer-aided three-dimensional prototype device (e.g., a bioprinter).

A bioprinter may include any instrument that automates the bioprinting process described herein. In one embodiment, the bioprinter can be a 3D printer, which may be selected by one of ordinary skill in the art. Any component of the bioprinter described herein may be operated by manual or robotic means as determined by one of ordinary skill in the art.

Bioprinters and their related components such as printer stages, receiving means, cartridges, dispensing means, extrusion means, electromagnetic radiation (EMR) source, optical device, software, and the like are described further in U.S. application Ser. No. 15/128,632 entitled "Methods, devices, and systems for the fabrication of materials and tissues utilizing electromagnetic radiation," and U.S. application Ser. No. 15/945,435 entitled "Multi-headed auto-calibrating bioprinter with heads that heat, cool, and cross-link," the contents of both of which are hereby incorporated by reference, in their entirety.

Figure 1:
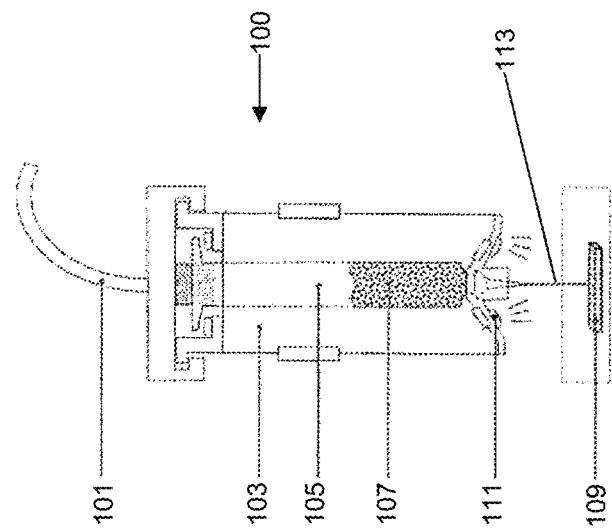
FIG. 1 is a diagram for a three-dimensional printer in accordance with some embodiments of the present disclosure.

FIG. 1 illustrates an exemplary system 100 for a bioprinter. As illustrated a conduit 101 may pass compressed gas into a cartridge 103 that includes a syringe 105 containing materials 107 configured to be printed using the bioprinter. As the materials 107 are dispensed from the syringe 105 onto a receiving plate 109 they may be cured using EMR released from an EMR module 111.

As illustrated in FIG. 1, in some embodiments the bioprinter may include a cartridge 103 that receives and holds a material 107. The material 107 may include a composition containing biomaterials that can cure into a desired cellular construct or structure. For example, the composition containing biomaterials can be cured using electromagnetic radiation at or above 405 nm that is emitted by the EMR module 111. In some embodiments, a bioprinter may be used to fabricate cellular constructs such as tissues and organs. In some embodiments the fabricated cellular constructs may have one or more layers. Material 107 may include bioceramics (e.g., calcium phosphate), carbohydrate derived inks, glass derived inks, thermoplastics, and the like.

As illustrated in FIG. 1, the materials 107 may be extruded from the cartridge 103 onto a receiving plate 109 using pneumatic pressure and the like.

In some embodiments, the receiving plate 109 is a substantially flat plate, or a multi-well plate. For example, the receiving plate 109 may be one or more of a petri-dish, a 6-well dish, a 12-well dish, a 96-well dish and a 128-well dish. Additionally, the receiving plate 109 may be located within the bioprinter and adjacent to the cartridge 103, or the receiving plate 109 may be adjacent to the printer stage. In the embodiment illustrated in FIG. 1, the receiving plate 109 may be positioned below the cartridge 103. Various materials for the receiving plate 109 and/or materials for modified surfaces attached to the receiving plate 109 may be discussed herein.

The cartridge 103 of the bioprinter may be configured to receive and hold a composition of a material 107 prior to deposition. In some embodiments, the bioprinter may have a plurality of cartridges 103. Each cartridge 103 may be configured to receive and hold the same or different materials 107. Materials 107 may be deposited by the cartridges 103 separately or concurrently. Cartridges 103 may be fabricated from glass, plastic, metal, gel or any combination thereof.

In some embodiments, the cartridge 103 may be connected to dispensing means such as a capillary tube, a micropipette, syringe 105, and/or a needle 113. For example, the dispensing means may include a syringe 105 and atomizer needle 113 (see FIG. 3A). In another example, the dispensing means may include a syringe 105 and a brush and dispenser assembly (see FIG. 3B).

Figure 2:
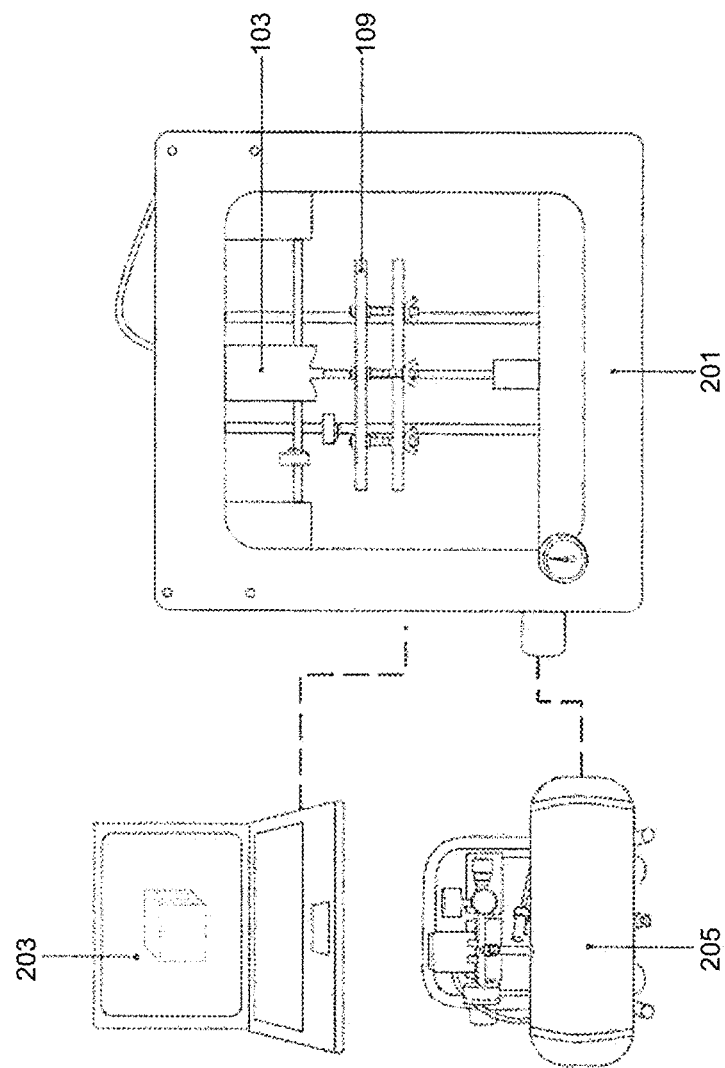
FIG. 2 is a diagram for a three-dimensional printer in accordance with some embodiments of the present disclosure.

FIG. 2 illustrates a system built in accordance with the systems and methods described herein. As illustrated in FIG. 2, a bioprinter 201 may be communicatively coupled to a computer 203 and pneumatically coupled to an air compressor 205. The air compressor 205 may be configured to be connected to and operatively associated with a cartridge 103 to provide a controller and pressure pump for the syringe 105. The pressure from the air compressor 205 may drive deposition of materials 107 onto the receiving plate 109 (or modified surfaces of the receiving plate 109). Alternatively, the materials 107 may be deposited on to the receiving plate 109 (or modified surfaces of the receiving plate 109) by a piston driven system. The deposition may be controlled by computer program code (e.g., computer aided design (CAD), g-code, etc.) programmed in computer 203.

In some embodiments, the systems and methods described herein may utilize a bioprinter having a brush that is configured to pattern a collagen layer. In some embodiments, the bioprinter may be used to make layered bioprinted materials.

In some embodiments, the systems and methods described herein may be used to generate tissue constructs in a high-throughput and reliable manner. For example, an atomizer needle may be used to dispense liquid (e.g., media, curing agents, etc.) over the tissue constructs in an automated manner that dispenses liquid without damaging the tissue construct at highly accurate amounts. In some embodiments, the systems and methods described herein may include a system for controlling the dispersion of liquids via an atomizer needle and syringe extrusion system whose operation is controlled by computer program code (e.g., g-code, .x3g files) on a computer device. The computer program code may determine the time and volume at which a liquid is dispensed from the atomizer needle.

In some embodiments, a system for printing biological materials may include a bioprinter communicatively coupled to a processor and non-transitory memory comprising instructions to control the operation of the bioprinter. The bioprinter may include a first cartridge configured to store a first cell-laden material, a second cartridge configured to store a liquid, a receiving plate configured to receive a deposited first cell-laden material, and a dispensing mechanism coupled to the second cartridge, further comprising an atomizer needle that is configured to dispense the liquid onto the deposited first cell-laden material in predetermined incremental amounts.

In some embodiments, a system for printing biological materials may include a bioprinter communicatively coupled to a processor and non-transitory memory comprising instructions to control the operation of the bioprinter. The bioprinter may include a first cartridge configured to store a first cell-laden material, a second cartridge configured to store hydrogel, a receiving plate configured to receive a deposited first cell-laden material, and a dispensing mechanism coupled to the second cartridge, further comprising a brush and dispenser assembly that is configured to dispense the hydrogel onto the deposited first cell-laden material and distribute the dispensed hydrogel on the receiving plate using the brush.

Figure 3A:
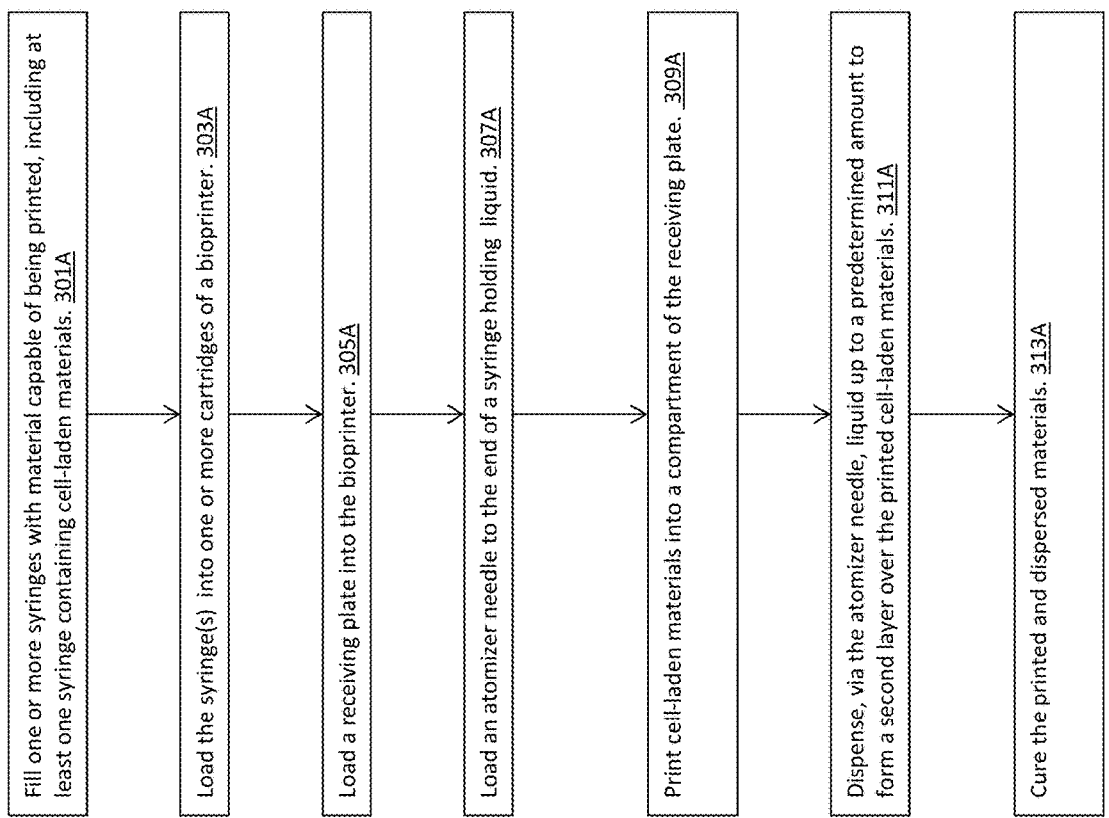
FIG. 3A is a flow diagram of a process for constructing a three-dimensional biological structure, in accordance with some embodiments of the present disclosure.
Figure 3B:
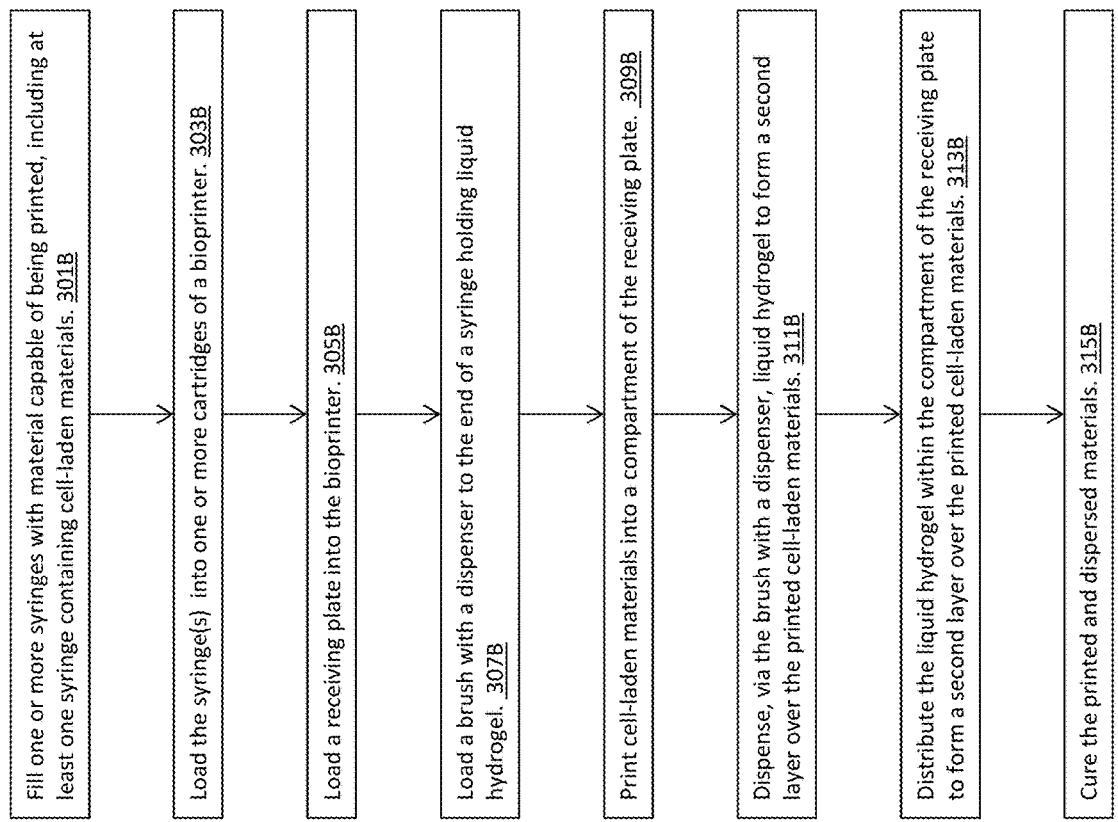
FIG. 3B is a flow diagram of a process for constructing a three-dimensional biological structure, in accordance with some embodiments of the present disclosure.

FIGS. 3A and 3B illustrate processes for creating 3D printed materials using a bioprinter such as the one illustrated in FIGS. 1 and 2. In some embodiments, the process illustrated in FIGS. 3A and 3B may construct a bioprinted material having a flat constant height.

In particular, FIG. 3A illustrates a process for constructing a biological structure using a liquid (e.g., tissue culture media, cell culture media, a curing solution). As illustrated in FIG. 3A, in some embodiments a method for printing biological materials may include the step 301A of filling one or more syringes with material capable of being printed, including at least one syringe containing cell-laden materials. In a second step 303A one or more syringes may be loaded into one or more cartridges of a bioprinter. In a third step 305A, a receiving plate may be loaded into the bioprinter. In a fifth step 307A an atomizer needle may be loaded to an end of a syringe from among the one or more syringes, wherein the syringe is configured to store a liquid such as tissue culture media, cell culture media, a curing solution and the like. In a sixth step 309A, cell-laden materials may be printed into a compartment of the receiving plate. In a seventh step 311A the atomizer needle may dispense liquid up to a predetermined amount to form a second layer over the printed cell-laden materials. In an eight step 313A, the printed and dispensed materials may be cured. For example, the printed and dispensed material may be cured via photocrosslinking, thermal crosslinking, and/or chemical crosslinking methods.

FIG. 3B illustrates a process for constructing a biomaterial structure including hydrogel. As illustrated in FIG. 3B, in some embodiments a method for printing biological materials includes the step 301B of filling one or more syringes with material capable of being printed, including at least one syringe containing cell-laden materials. In a second step 303B the one or more syringes may be loaded into one or more cartridges of a bioprinter. In a third step 305B, the receiving plate may be loaded into the bioprinter. In a fourth step 307B, a brush with a dispenser may be loaded to the end of a syringe from among the one or more syringes, where the syringe is configured to store liquid hydrogel. In a fifth step 309B cell-laden materials may be printed into a compartment of the receiving plate. In a sixth step 311B, liquid hydrogel may be dispensed via the brush with a dispenser to form a second layer over the printed cell-laden materials. In a seventh step the liquid hydrogel within the compartment of the receiving plate may be distributed using the brush. In a seventh step 311C, the printed and distributed materials may be cured. The final structure may be cured through thermal, photo, or chemical crosslinking processes. For certain crosslinking processes, the printing surface may be placed in a culture dish with a plastic lid to maintain proper humidity and avoid drying out the printed substrates while crosslinking. Crosslinking may take anywhere from a few seconds up to about an hour.

Figure 4A:
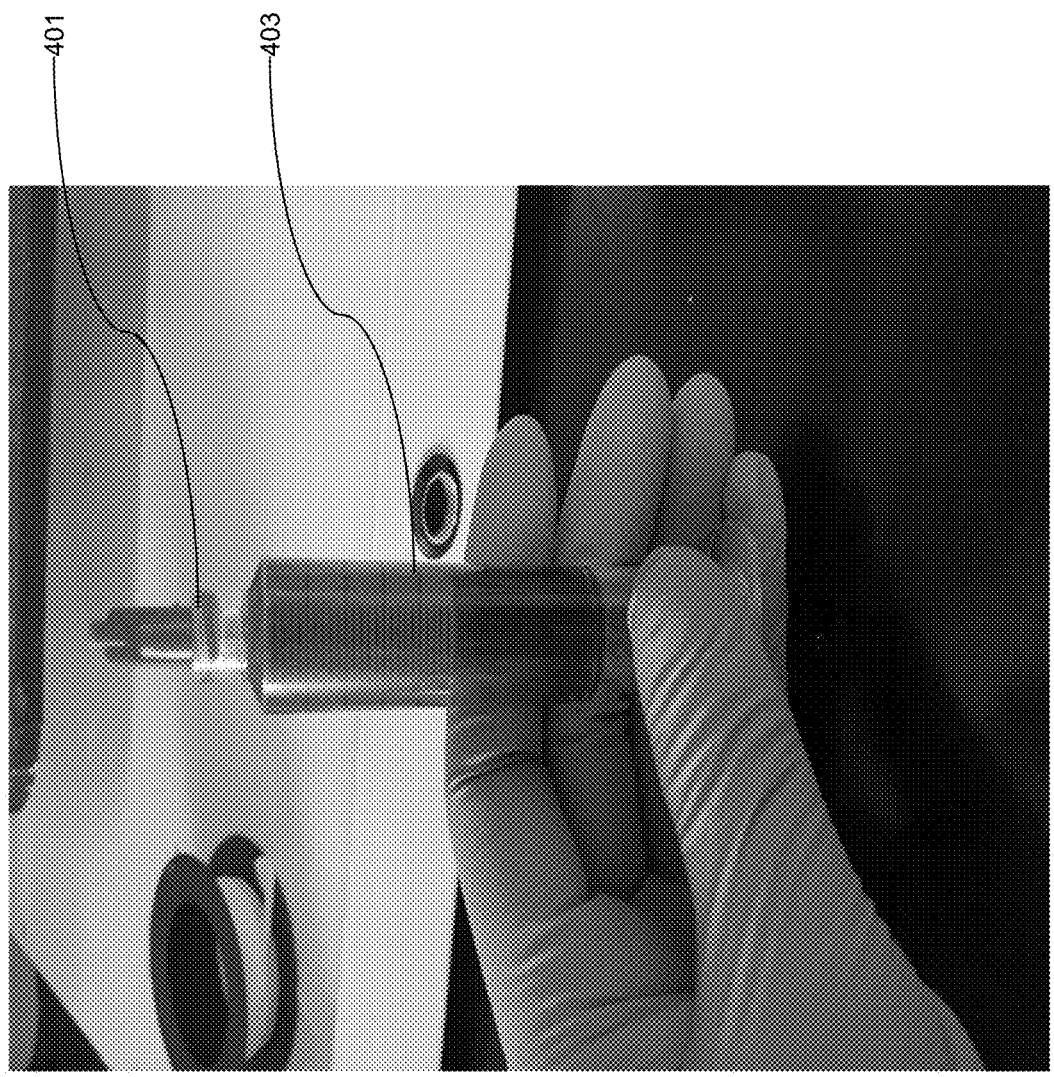
FIG. 4A provides an illustration of systems and methods for constructing a three-dimensional biological structure, in accordance with some embodiments of the present disclosure.

FIGS. 4A-4G illustrates aspects of the processes described in FIGS. 3A-3B. In particular, FIG. 4A illustrates a syringe 401 filled with materials 403 capable of being printed. Example materials may include media, liquid hydrogel and the like. In some embodiments, syringe 401 may be filled with cell-laden materials (e.g., cells, cell media, a curing solution, growth factor, DNA, common biological materials). In some embodiments, the syringe 401 may be capped such that the material 403 is not able to exit the syringe 401.

Figure 4B:
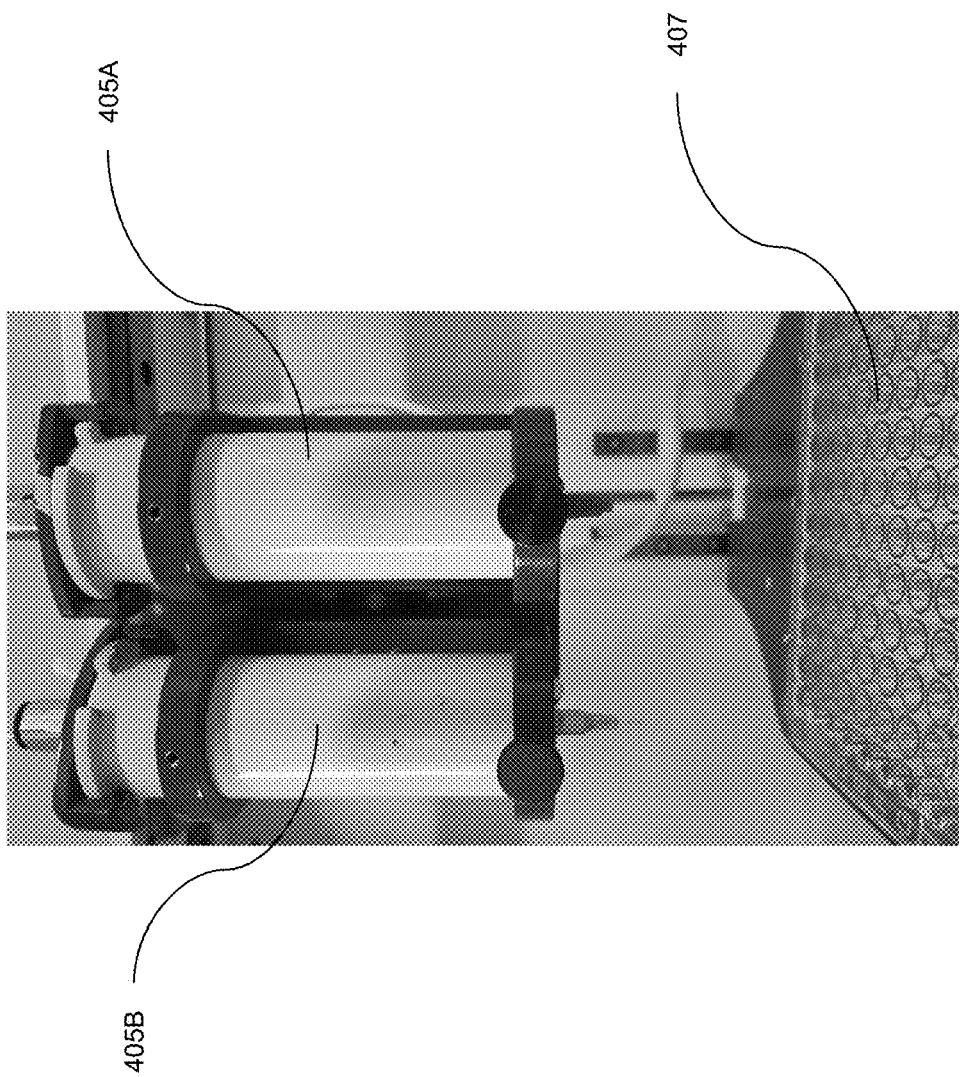
FIG. 4B provides an illustration of systems and methods for constructing a three-dimensional biological structure, in accordance with some embodiments of the present disclosure.

FIG. 4B illustrates how the syringe 401 may be loaded into a cartridge 405A, 405B of the bioprinter. In the illustrated embodiment, the bioprinter has two cartridges 405A and 405B. Each cartridge 405A, 405B may include a syringe 401 containing different material. For example, in some embodiments, the cartridge 405A may be configured to contain a liquid and the cartridge 405B may be configured to contain cell-laden materials. Example liquids may include any liquid having a viscosity similar to water. For example, the liquid may be water, cell culture media, phosphate buffered saline (PBS), hydrogels, a curing solution, and the like.

Alternatively, in an embodiment for constructing hydrogels, the cartridge 405A may be configured to contain hydrogel and the cartridge 405B may be configured to contain cell-laden materials.

Additionally, FIG. 4B illustrates that a receiving plate 407 may be loaded into the bioprinter. The receiving plate 407 or dish may be of any size, including but not limited to, a petri-dish, a 6-well dish, a 12-well dish, a 96-well dish and a 128-well dish.

Figure 4C:
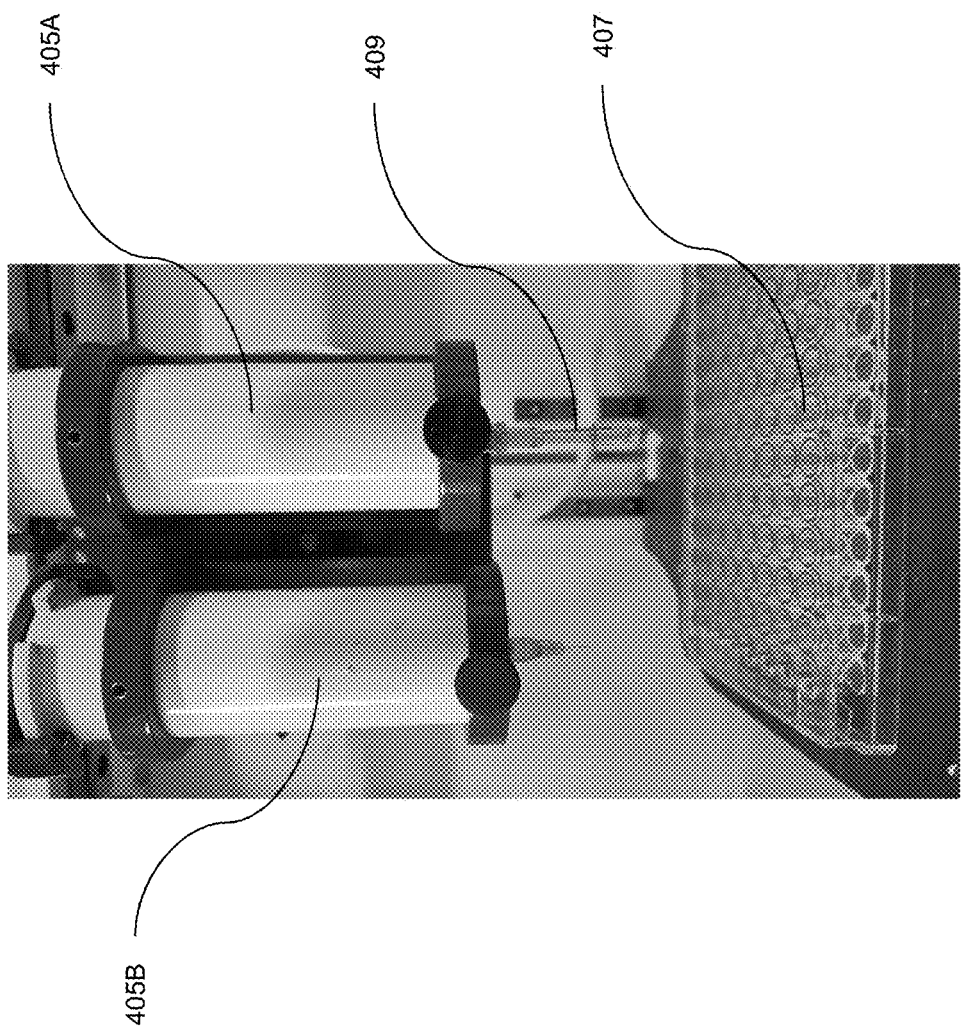
FIG. 4C provides an illustration of systems and methods for constructing a three-dimensional biological structure, in accordance with some embodiments of the present disclosure.

FIG. 4C illustrates an atomizer needle 409 loaded onto the end of syringe held in cartridge 405A. In some embodiments, the atomizer needle 409 may be attached to the syringe held in cartridge 405A may have a luer lock tip. In some embodiments, the luer lock tip may allow for defined incremental dispension. In particular, the luer lock tip may be configured to extrude in droplets (as opposed to filaments). Cartridge 405A may be configured to store and dispense liquid.

The atomizer needle 409 may vary in diameter and size. The diameter and size of the atomizer needle 409 may encourage or discourage the intermediary capping step described in connection with step 301A. For example, in embodiments with a smaller and slimmer atomizer needle 409, the intermediary capping stepped may not be required as a user may be able to directly attach the atomizer needle to the extruder canister. In some embodiments, the droplets may range from 1-100 microliters. A needle may be configured to hold a particle having a size between about 30-100 microns. Further, in some embodiments, a needle may include a tip diameter of 0.17 inches (4.3 mm) and/or an applicator length on the order of approximately 1.65 inches (4.2 cm).

Figure 4D:
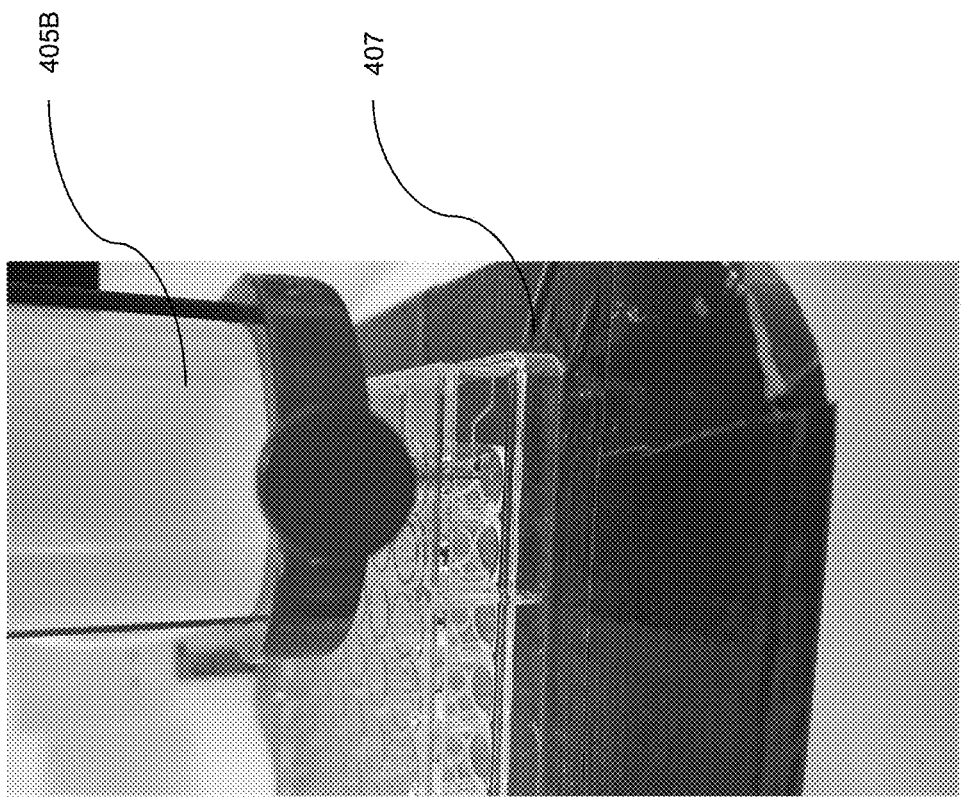
FIG. 4D provides an illustration of systems and methods for constructing a three-dimensional biological structure, in accordance with some embodiments of the present disclosure.

FIG. 4D illustrates how a cartridge 405B loaded with the cell-laden materials may be lowered into a well or compartment of a receiving plate 407 and configured to print (or dispense) the cell-laden materials into the well or compartment of the receiving plate 407.

Figure 4E:
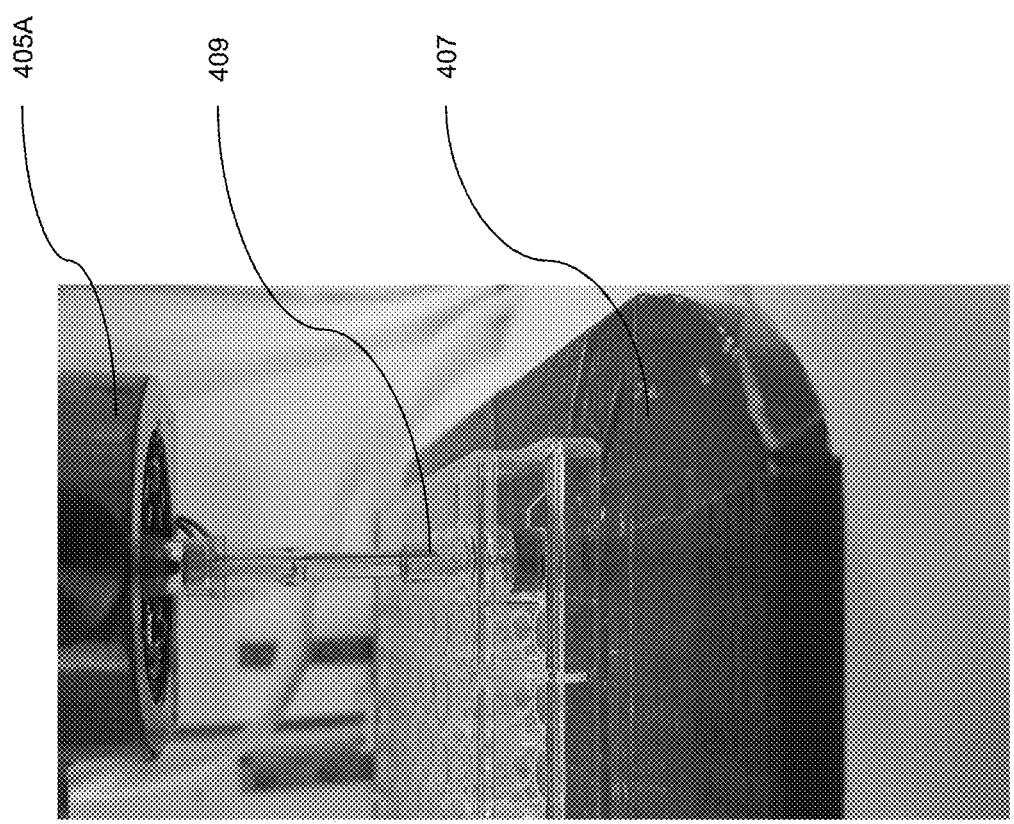
FIG. 4E provides an illustration of systems and methods for constructing a three-dimensional biological structure, in accordance with some embodiments of the present disclosure.

FIG. 4E illustrates how a cartridge 405A including the atomizer needle 409 may be lowered into a well or compartment of the same receiving plate 407 and configured to print (or dispense) liquid. In some embodiments, computer program code (e.g., CAD file, g-code file) may coordinate the amount of liquid dispensed by the atomizer needle 409. For example, the computer program code may coordinate the dispensing of a predetermined total amount of liquid at a predetermined increment size. In some embodiments, the computer program code may control the time that the bioprinter is configured to dispense the material for. Increment sizes may include (but are not limited to) 1 microliter, 10 microliters, 100 microliters or 1 milliliters. The predetermined total amount may be in the range of about 1 microliter to about 100 milliliters.

As illustrated in FIG. 4F, a brush having a dispenser 411 may be loaded onto the end of the syringe held in cartridge 405A. In accordance with the process for Branch B, cartridge 405A may be configured to store and dispense liquid hydrogel. Liquid hydrogel may include one or more of a collagen, gelatinous protein mixtures, Matrigel®, low viscous alginate, gelatin, Polyethylene (glycol) Diacrylate (PEGDA), gelatin methacrylate, and the like. Further, the cartridge 405A including the brush with dispenser 411 may be lowered into a well or compartment of the same receiving plate 407 and configured to print (or dispense) the liquid hydrogel to form a second layer over the printed cell-laden materials. In some embodiments, the cartridge 405A holding the syringe with hydrogel may have a volume of one of about 500 microliters, about 1 milliliter, about 3 milliliters, about 5 milliliters, about 10 milliliters, and the like.

Figure 4G:
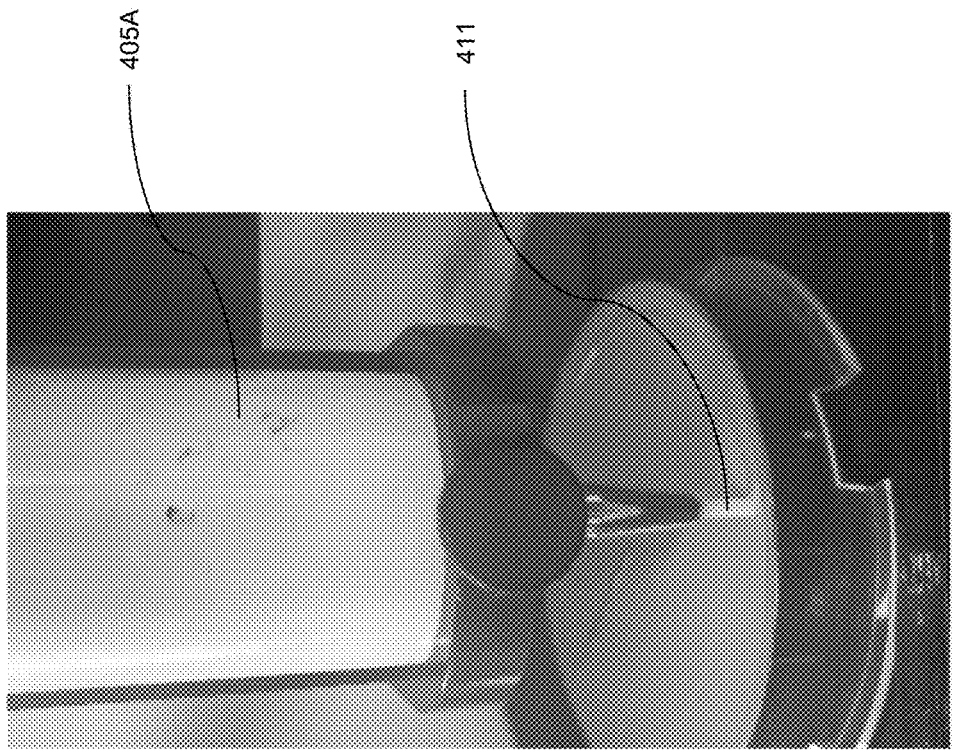
FIG. 4G provides an illustration of systems and methods for constructing a three-dimensional biological structure, in accordance with some embodiments of the present disclosure.

As illustrated in FIG. 4G a brush may distribute the liquid hydrogel within the compartment of the receiving plate to form the second layer over the printed cell-laden materials. In some embodiments, this may allow for the construction of a flat surface having a constant height. The liquid hydrogel may be dispensed first and then spread with the brush. Alternatively, the liquid hydrogel may be dispensed concurrently with the movement of the brush. The movement of the brush and dispensing of the liquid may be controlled by computer program code located on computer 203. The computer program code may be configured to be adjusted for various designs, movement, dispension and brushing of the liquid. The dispension pattern for the liquid hydrogel and/or the movement of the brush may be adjusted by the computer program code.

Figure 5:
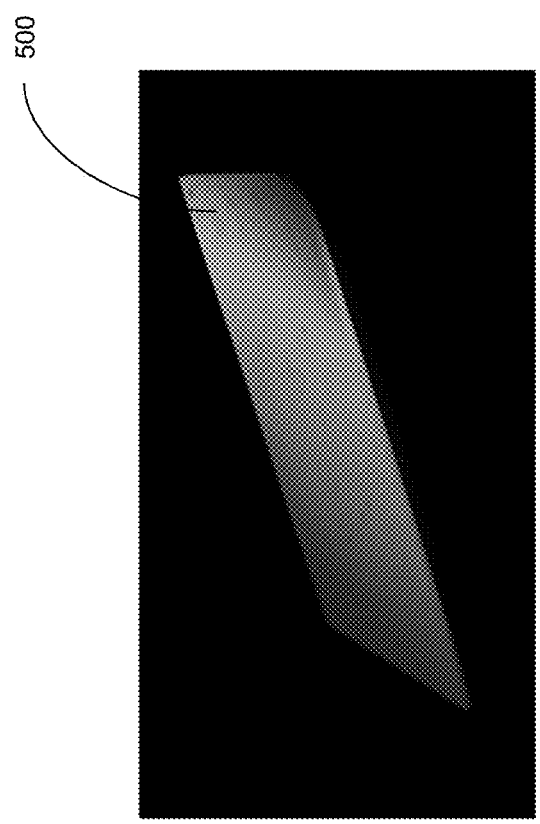
FIG. 5 provides an illustration of imaging applied to a biological structure printed in accordance with some embodiments of the present disclosure.
Figure 6:
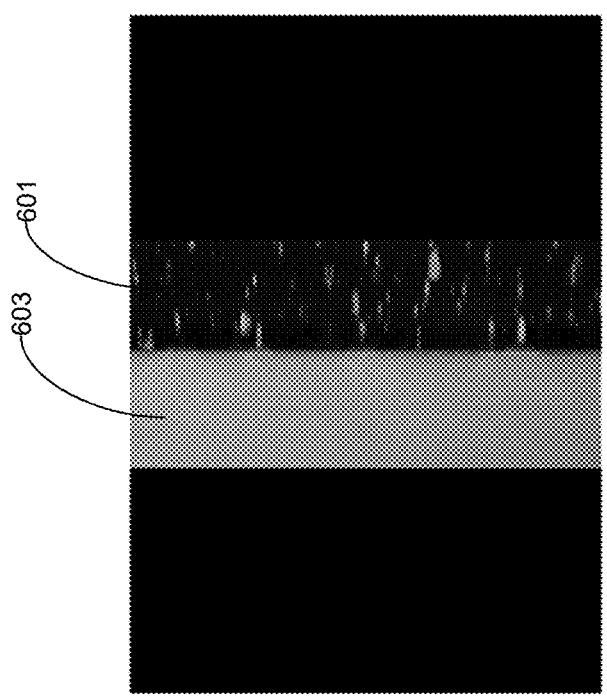
FIG. 6 provides an illustration of imaging applied to a biological structure printed in accordance with some embodiments of the present disclosure.

In some embodiments, the resulting biological printed material may be imaged using microscopes. In particular, the resulting biological structures may be imaged to observe thickness and depth of the layers formed by the first material (e.g., cell-laden material) and the second material (e.g., hydrogel or a liquid). In some embodiments, the systems and methods described herein may be used to produce bioprinted materials having one or more layers. Each of the one or more layers may have a depth of approximately 10-500 micrometers. The layers may include materials such as collagen, Matrigel®, low viscosity alginate, gelatin, gelatin methacrylate and the like. In some embodiments, the systems and methods described herein may integrate cells, fluorescent markers, or fluorescently labeled beads into the printed biological structure. Accordingly, the printed biological structure may be viewed using a fluorescent microscope, confocal microscope and the like. In particular, the depth and thickness of the printed biological structure may be viewed using fluorescent imaging techniques, as is illustrated in FIGS. 5 and 6. In particular, as illustrated in FIG. 6, fluorescent components 601 and the multilayer structure 603 of the biological printed material 500 may be visible using fluorescent imaging techniques.

In some embodiments, the disclosed systems and methods provide modified surfaces upon which materials may be printed using a three-dimensional (3D) bioprinter. In one embodiment, a modified surface such as sandpaper may be optimized for the printing of granular materials. In another embodiment, a modified surface such as flexible silicone rubber may be optimized for the printing of materials having high melting temperatures. The modified surfaces discussed herein may provide an optimal environment for the printing of hydrogels and the like.

In some embodiments, a bioprinter is communicatively coupled to a processor and non-transitory memory comprising instructions to control the operation of the bioprinter. The bioprinter may include a cartridge configured to store a material, a modified surface configured to receive a deposited material, and a dispensing mechanism coupled to the cartridge configured to dispense the material onto the modified surface. In some embodiments the modified surface includes sandpaper including Aluminum Oxide having a coarsity between about 40 to about 600 grit, and the material includes a bioceramic. In other embodiments, the modified surface includes a flexible silicone rubber, and the material includes a melting temperature greater than or equal to sixty degrees Celsius.

In some embodiments, a method for printing biological materials includes constructing a modified surface having dimensions to match a receiving plate, printing materials using a bioprinter onto the modified surface, curing the printed materials, and extracting the printed materials from the modified surface The modified surface may allow for the printing of biological materials having varied structure and organization that may have been difficult to print on non-modified surfaces and/or difficult to remove from non-modified surfaces.

Figure 7:
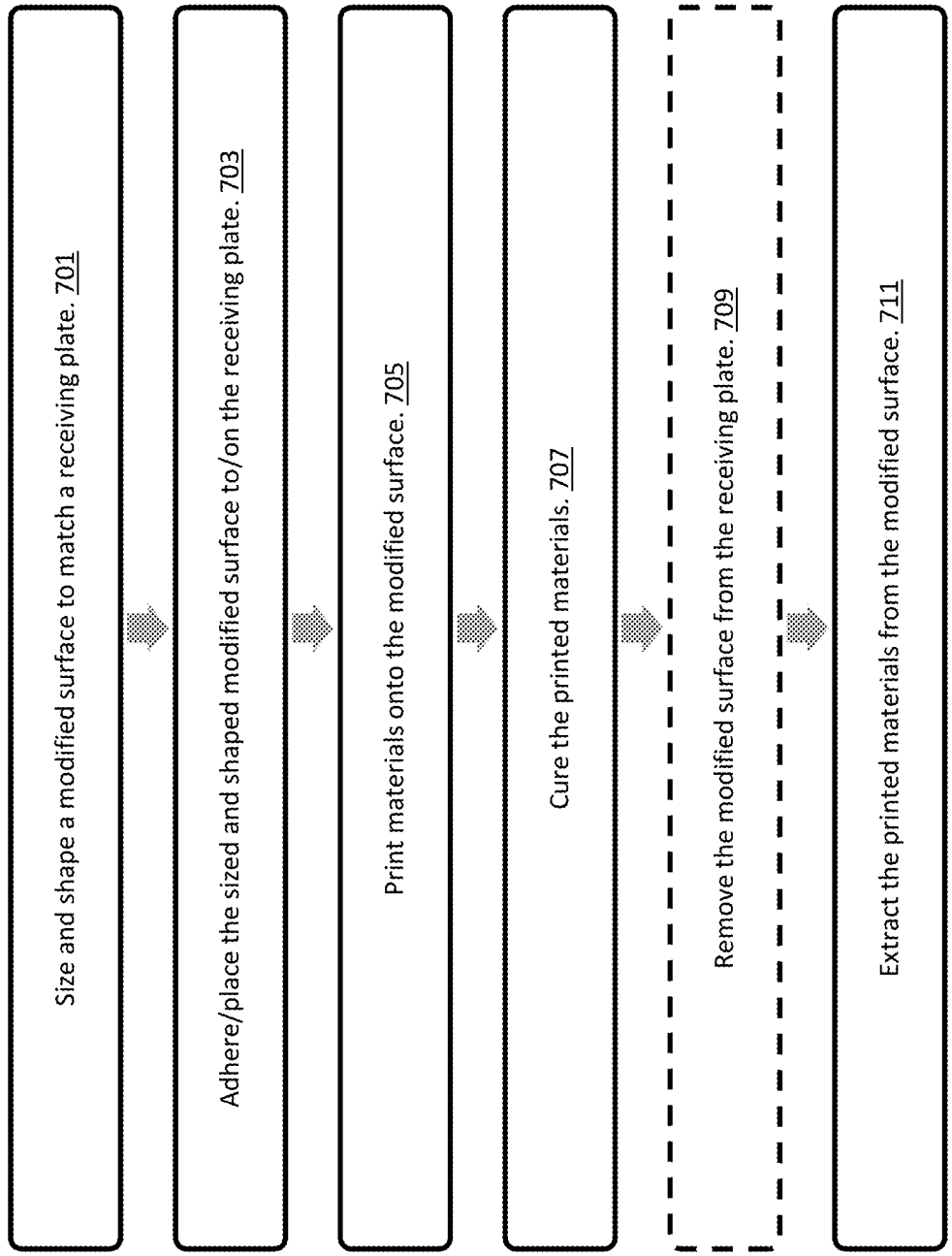
FIG. 7 provides a flow diagram of a process for printing a three-dimensional biological structure on a modified surface, in accordance with some embodiments of the present disclosure.

FIG. 7 illustrates a process for 3D printing biological substrates onto a modified surface. At step 701, a modified surface may be sized and shaped to match a receiving plate such as receiving plate 109 of FIG. 1. Optionally, at step 703, the modified surface may be adhered to the receiving plate. Alternatively, the modified surface may be placed onto the receiving plate. At step 705, materials may be printed using the 3D bioprinter onto the modified surface. At step 707, the printed materials may be cured on the modified surface. Optionally, at step 709, the modified surface may be removed from the receiving plate 309. At step 711, the printed materials may be extracted from the modified surface. In some embodiments, the modified surface may be bent in a direction away from the printed materials such that the printed materials may be extracted from the modified surface.

Figure 8A:
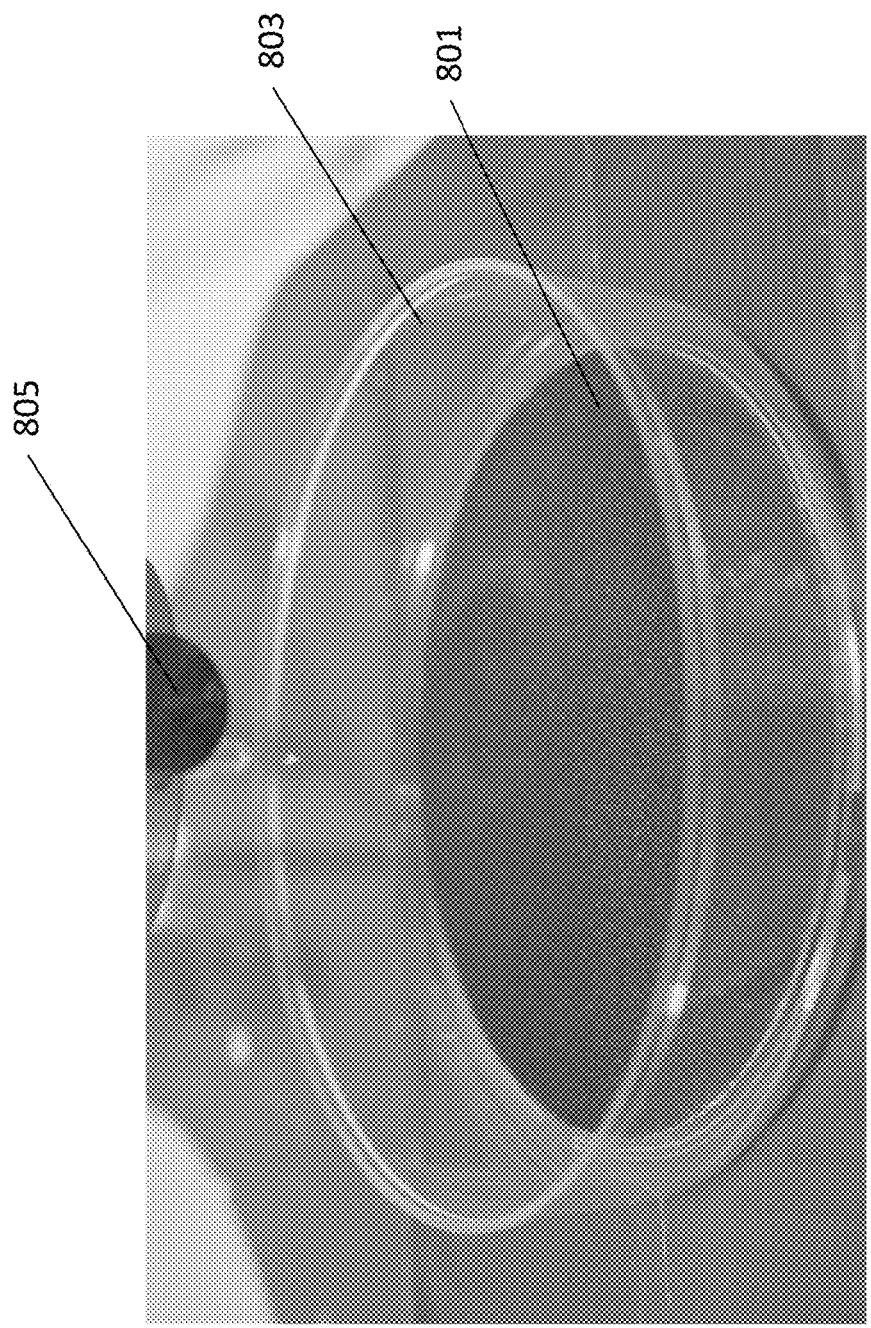
FIG. 8A provides a process for 3D printing biological substrates onto a modified surface of sandpaper, in accordance with some embodiments of the present disclosure.
Figure 8B:
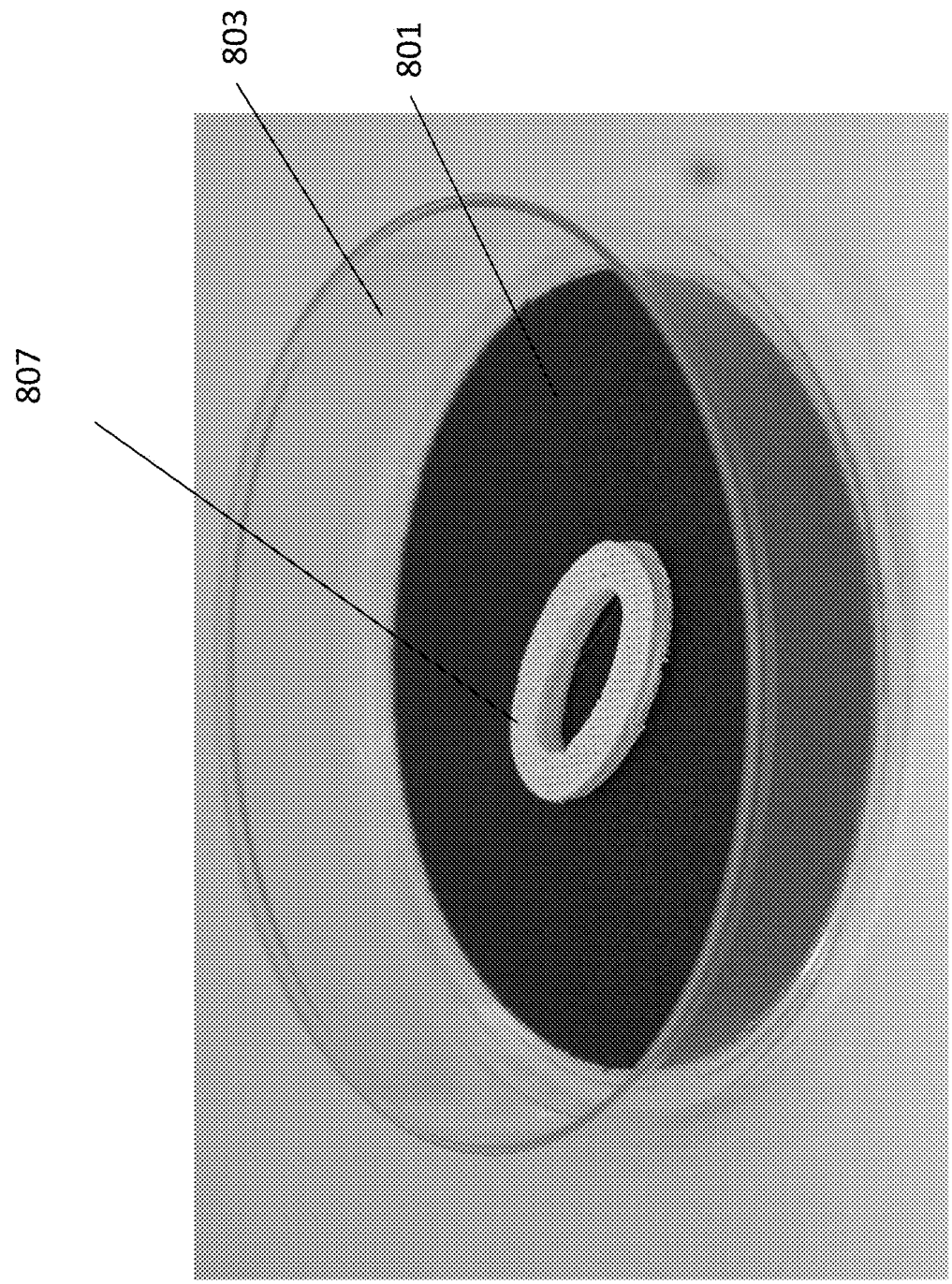
FIG. 8B provides a process for 3D printing biological substrates onto a modified surface of sandpaper, in accordance with some embodiments of the present disclosure.
Figure 8C:
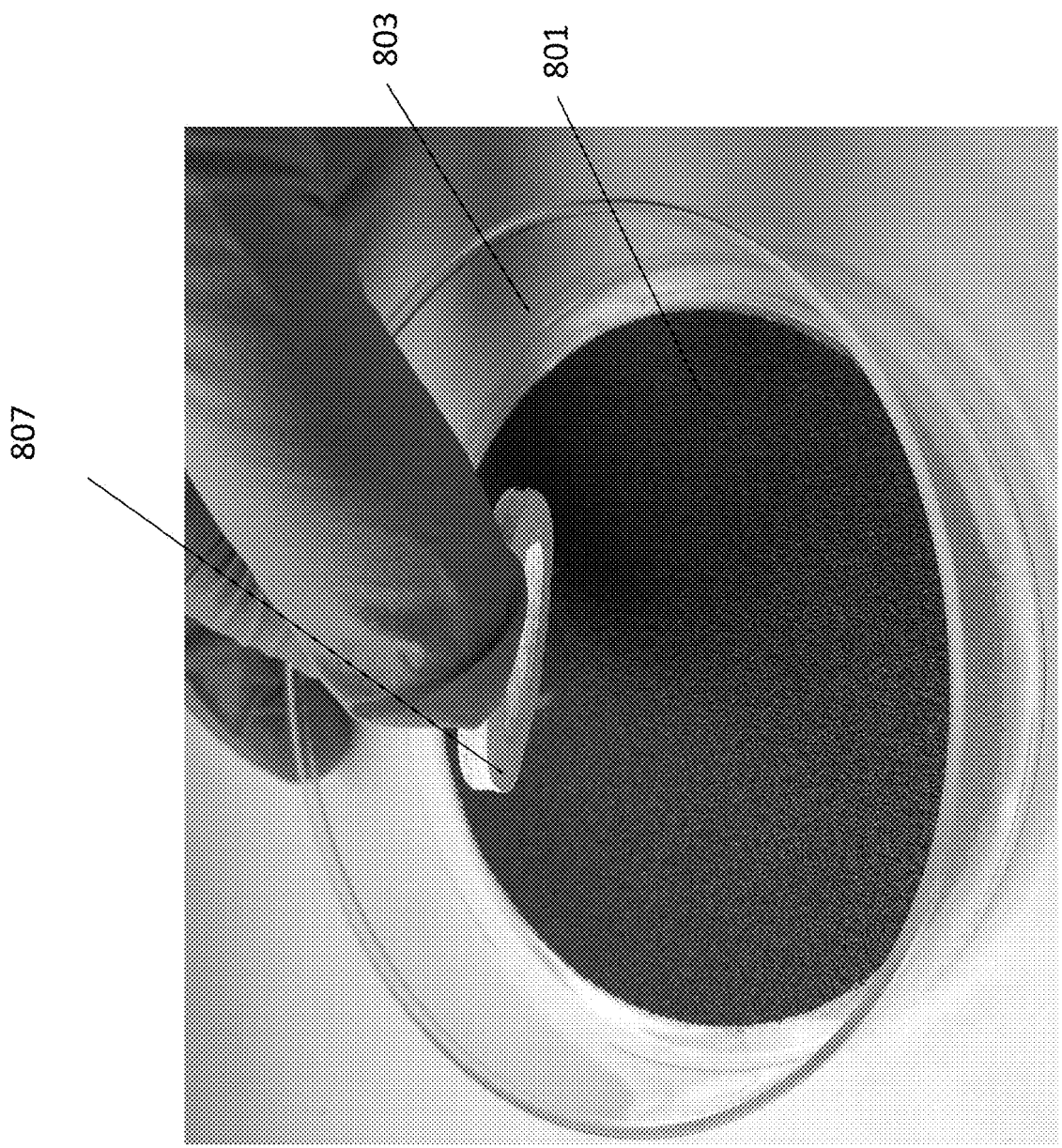
FIG. 8C provides a process for 3D printing biological substrates onto a modified surface of sandpaper, in accordance with some embodiments of the present disclosure.

FIGS. 8A-8C illustrate an example of a process for 3D printing biological substrates onto a modified surface of sandpaper. Sandpaper surfaces may be optimized for printing granular mixtures such as bioceramics (e.g., calcium phosphate) and other composites. Notably, in comparison to conventional receiving plates, the modified surface of sandpaper allows for better adherence of printed materials, thereby allowing the reliable formation of 3D structures. Additionally, the printed materials may be removed from the modified surface of sandpaper easily and without damage to the printed materials because the printed materials do not fuse onto the modified surface of sandpaper. In some embodiments, the sandpaper may have a coarsity between about 40-600 grit. In some embodiments, the sandpaper may include a grit grain of Aluminum Oxide or any other suitable material.

As illustrated in FIG. 8A, a bioprinter 805 may be configured to print materials onto the modified surface 801 that is adhered to the receiving plate 803. Example adhesives may include pressure sensitive adhesives and the like. In the illustrated example, the receiving plate 403 is a petri-dish and the modified surface 801 is sandpaper.

As illustrated in FIG. 8B, the printed materials 807 may be printed onto the modified surface 801 that is adhered to the receiving plate 803.

As illustrated in FIG. 8C, the printed materials 807 may be easily extracted from the modified surface 801 adhered to the receiving plate 803.

FIGS. 9A-9D illustrate an example of a process for 3D printing biological substrates onto a modified surface of a flexible silicone rubber. A flexible silicone rubber may be optimized for receiving printed materials having high melting temperatures (i.e., melting temperatures greater than or about sixty degrees Celsius). In some embodiments, the flexible silicone rubber may be configured to withstand temperatures of approximately one hundred and twenty degrees Celsius. Printed materials having high melting temperatures may include carbohydrate derived inks, glass derived inks, thermoplastics and the like. In comparison with conventional receiving plates, the modified surface of flexible silicone rubber allows for better detachment or extraction of the printed materials from the surface without causing damage to the printed materials. In some embodiments, the flexible silicone rubber may have a tensile strength and flexibility that allows the flexible silicone rubber to be capable of being bent. In some embodiments, detachment or extraction of the printed materials from the surface is performed by bending the flexible silicone rubber. In some embodiments, the flexible silicone rubber may have a thickness that allows for bending. For example, the flexible silicone rubber may have a thickness in the range of about 0.02 inches to about 0.125 inches.

Figure 9A:
FIG. 9A provides a process for 3D printing biological substrates onto a modified surface of flexible silicone rubber, in accordance with some embodiments of the present disclosure.

As illustrated in FIG. 9A, a flexible silicone rubber 901 may be cut to match the shape of a receiving plate. The flexible silicone rubber 901 may be cut out from machined silicone sheets. In some embodiments, the modified surface of flexible silicone rubber 901 may be placed upon a receiving plate. Alternatively, in some embodiments the flexible silicone rubber 901 may be used without a receiving plate.

Figure 9B:
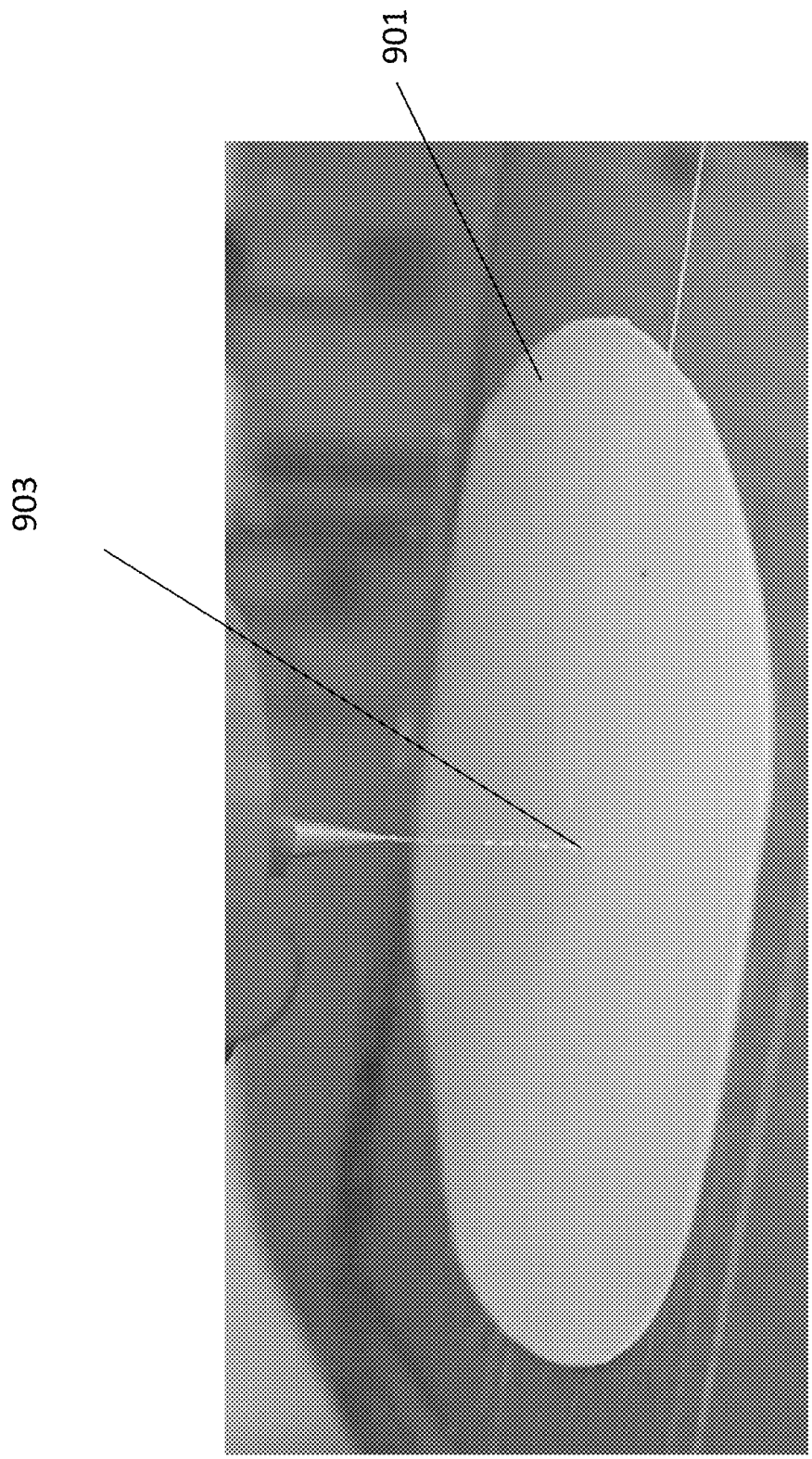
FIG. 9B provides a process for 3D printing biological substrates onto a modified surface of flexible silicone rubber, in accordance with some embodiments of the present disclosure.

As illustrated in FIG. 9B, materials 903 may be printed onto the modified surface of flexible silicone rubber 901.

Figure 9C:
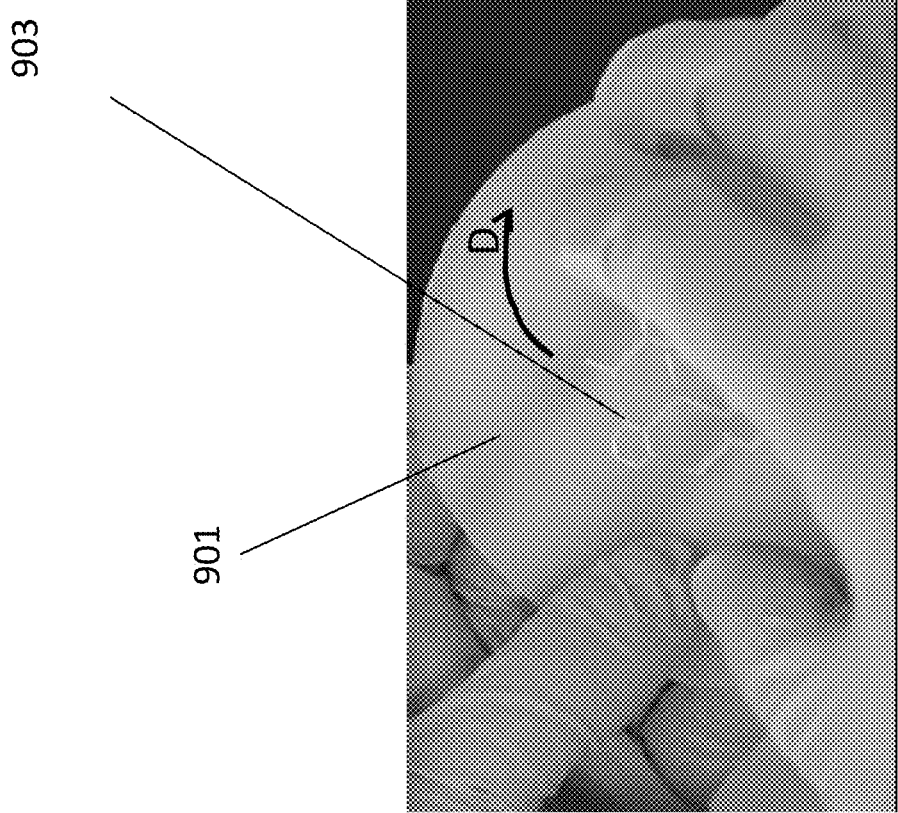
FIG. 9C provides a process for 3D printing biological substrates onto a modified surface of flexible silicone rubber, in accordance with some embodiments of the present disclosure.
Figure 9D:
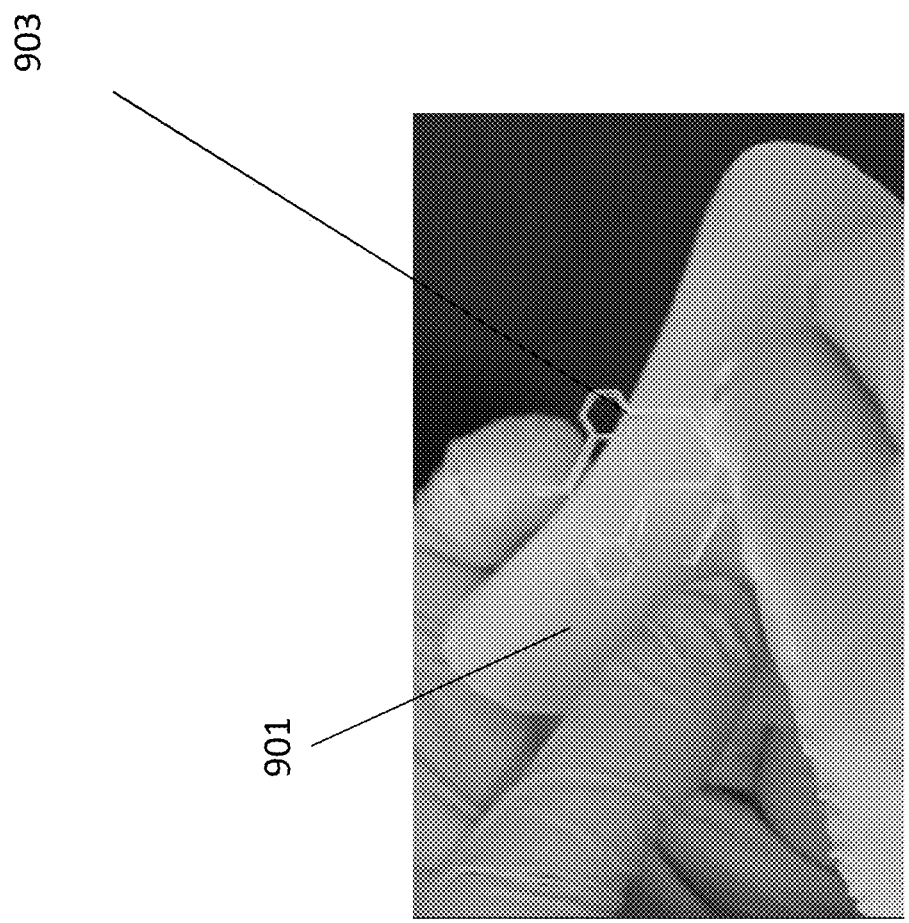
FIG. 9D provides a process for 3D printing biological substrates onto a modified surface of flexible silicone rubber, in accordance with some embodiments of the present disclosure.

As illustrated in FIGS. 9C and 9D, materials 903 may be detached or extracted from the modified surface of flexible silicone rubber 901. As illustrated in FIG. 9D, in some embodiments this may involve flexing or bending the flexible silicone rubber 901 in a direction D substantially away from the printed material 903.

In some embodiments, the disclosed systems and methods provide modified surfaces upon which materials may be printed using a three-dimensional (3D) bioprinter. The modified surfaces may include a hydrophobic surface including polydimethylsiloxane (PDMS). Accordingly, the hydrophobic surface may be used in connection with 3-D printing low-viscous and/or non-viscous materials. Additionally, materials may be dispensed upon a hydrophobic surface such as PDMS in a line or other arrangement that allows for easier patterning. Further, a hydrophobic surface, such as one provided by PDMS may be used with small droplet suspensions. Small droplet suspensions may be on the nanometer, microliter, or milliliter size.

Figure 10:
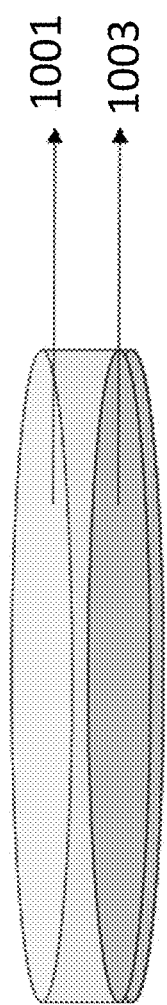
FIG. 10 provides an illustration of a modified surface for 3D printing biological substrates, in accordance with some embodiments of the present disclosure.

FIG. 10 provides an illustration of a modified surface for 3D printing biological substrates, in accordance with some embodiments of the present disclosure. As illustrated in FIG. 10, a well 1001 may include a bottom surface that is coated by a hydrophobic surface 1003 such as PDMS. The hydrophobic surface may provide the advantages discussed above.

In some embodiments, small dots and shapes may be patterned onto the hydrophobic surface using cross-linkable hydrogels. The cross-linkable hydrogels may be dispensed or bioprinted.

In some embodiments, hydrogel objects may be constructed by providing a hydrophobic surface (e.g., PDMS surface), and then dispensing cross-linkable hydrogel onto the hydrophobic surface. Examples of cross-linkable hydrogels may include, but are not limited to, collagen (and its modifications), hyaluronic acid (and its modifications), gelatin (and its modifications), fibrin (and its modifications), nanocellulose (and its modifications), alginate (and its modifications), PEG (and its modifications), chitosan (and its modifications), pluronic (and its modifications), gelatinous protein mixtures, Matrigel®, low viscous alginate, gelatin, Polyethylene (glycol) Diacrylate (PEGDA), gelatin methacrylate, and the like. The dispensed material may then be cured by applying at least one of a light, heat, or chemical crosslinker. Media may be added to the generated hydrogel object. Media may include tissue culture media, cell culture media, and the like.

Figure 11:
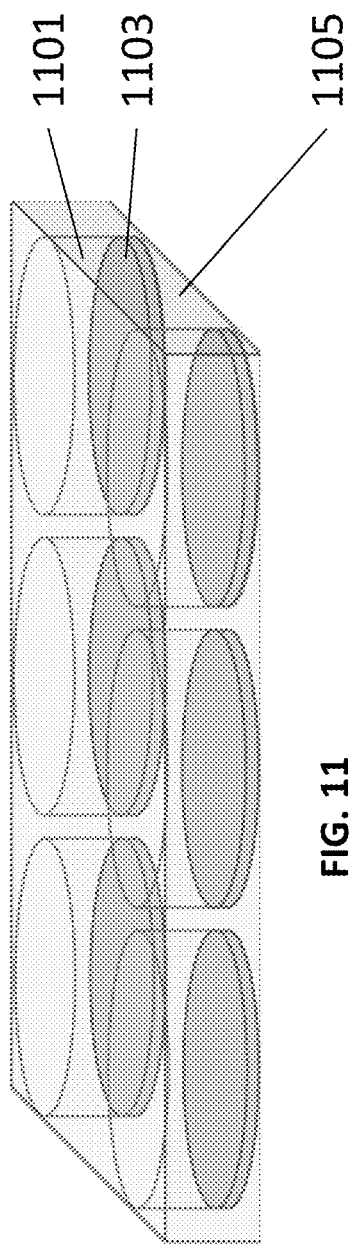
FIG. 11 provides an illustration of modified surfaces for 3D printing biological substrates, in accordance with some embodiments of the present disclosure.

FIG. 11 provides an illustration of a modified surfaces for 3D printing biological substrates, in accordance with some embodiments of the present disclosure. As illustrated, a receiving plate 1105 similar to receiving plate 109 of FIG. 1, may include one or more wells 1101 each including a hydrophobic surface 1103.

Figure 12:
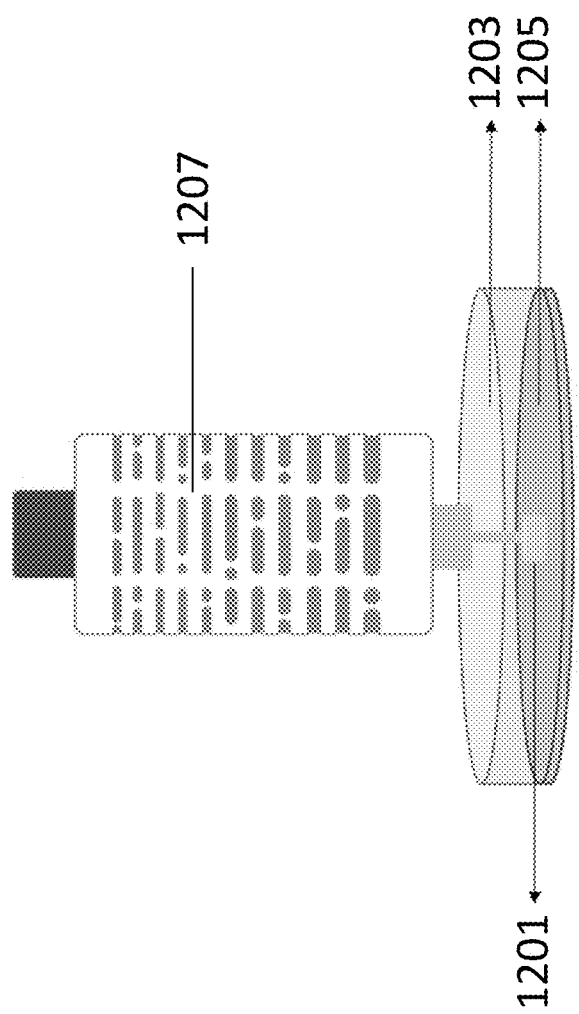
FIG. 12 provides an illustration of a system for 3D printing biological substrates onto a modified surface, in accordance with some embodiments of the present disclosure.

FIG. 12 provides an illustration of a system for 3D printing biological substrates onto a modified surface, in accordance with some embodiments of the present disclosure. As illustrated, a bioprinter 1207 may print or extrude materials 1201 onto a modified surface 1205 located within a well 1203.

Figure 13:
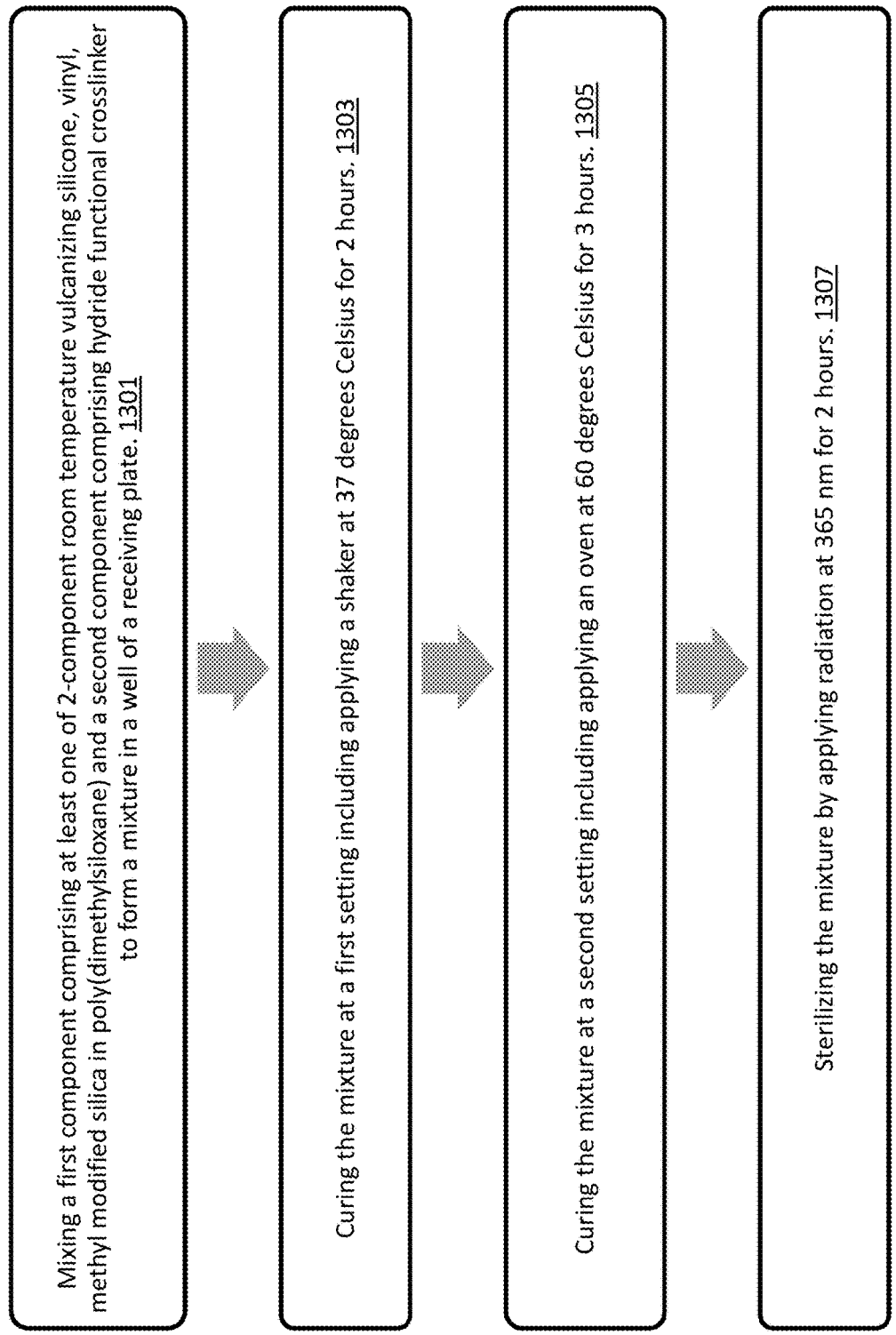
FIG. 13 provides a process for constructing a modified surface, in accordance with some embodiments of the present disclosure.

FIG. 13 provides a process for constructing a modified surface, in accordance with some embodiments of the present disclosure. As illustrated in FIG. 13, the process may include a first step 1301 of mixing a first component comprising at least one of 2-component room temperature vulcanizing silicone, vinyl, methyl modified silica in poly(dimethylsiloxane) and a second component comprising hydride functional crosslinker to form a mixture in a well of a receiving plate. In a second step 1303, the mixture may be cured at a first setting including applying a shaker at 37 degrees Celsius for 2 hours 1303. In a third step 1305, the mixture may be cured at a second setting including applying an oven at 60 degrees Celsius for 3 hours. In a fourth step 1307, the mixture may be sterilized by applying a radiation, such as gamma or ultraviolet radiation. In some embodiments, the radiation may include 365 nm applied for a period of 2 hours.

In some embodiments, mixing the components may involve a 10:1 ratio of a first component including 2-component room temperature vulcanizing silicone, vinyl, methyl modified silica in poly(dimethylsiloxane), and a second component including hydride functional crosslinker. The two components may be mixed at a 10:1 proportion using a speed mixer.

The mixture may be directly mixed (and cured) in a well of a receiving plate. For example, the receiving plate may be have any suitable dimensions, including, but not limited to, a Petri dish, 6-well plate, 12-well plate, 24-well plate, 48-well plate, 96-well plate, 384-well plate, and 1536-well plate.

In some embodiments, the curing process may involve two steps. In a first step, the mixture and related receiving plate may be placed on a shaker at 37 degrees Celsius for 2 hours. By being placed on a shaker, the mixture may be homogenously spread throughout the well, thereby forming a surface without a meniscus. The mixture may form a layer having a height between about 20-200 μm. Further, a shaker may be configured to rotate at 80 rotations per minute. In some embodiments, the shaker may be configured to rotate at any suitable speed including from about 40 to 180 rotations per minute.

In a second step of the curing process, the mixture and related receiving plate may be placed in an oven for additional curing. In some embodiments, the oven may operate at 60 degrees Celsius for 3 hours. In some embodiments, the oven may operate in the range of approximately 20 degrees Celsius to 80 degrees Celsius.

The two-step curing process may assist in ensuring that the resulting hydrophobic surface is level. Further, it may assist in preventing air bubbles from being trapped in the PDMS.

In some embodiments, due to the hydrophobic nature of the mixture, the modified surface may be optimal for hydrogel deposition. The hydrophobic nature of the mixture would allow for more stability of printed constructs.

Additionally, in some embodiments, surface modifications to add groups to the PDMS may be used to modify interactions between the surface and the deposited material. Examples include nanoparticle surface modifications, dynamic surfactant treatments, plasma and graft polymer coatings, hydrolyzation surface modifications, and the like.

The disclosed systems and methods may be used to create a 3D bioprinter and/or 3D culture dish that is optimal for hydrogel dispensing and tissue engineering. In particular, the modified surfaces described herein may allow for a hydrogel to be cultured without adhering to the bottom of the dish (and deforming). Example hydrogels may include collagen (and its modifications), hyaluronic acid (and its modifications), gelatin (and its modifications), fibrin (and its modifications), nanocellulose (and its modifications), alginate (and its modifications), PEG (and its modifications), chitosan (and its modifications), pluronic (and its modifications), and the like.

For example, the receiving plate may be made of glass, polystyrene, polypropylene or other plastics and coated with PDMS of 20-200 µm thickness that can be modified and optimized for specific surface profiles.

The materials deposited onto the modified surface can be cell-laden or not cell-laden. In some embodiments, the surface may be sterile (for use with cells) or non-sterile (for use without cells).

In some embodiments, the disclosed systems and methods may be used to create different tissue models, including cancer tumors from patient cells or commercially available cancer cell lines, and can be connected to pumps for induced flow.

Although the present disclosure may provide a sequence of steps, it is understood that in some embodiments, additional steps may be added, described steps may be omitted, and the like. Additionally, the described sequence of steps may be performed in any suitable order.

While illustrative embodiments have been described herein, the scope thereof includes any and all embodiments having equivalent elements, modifications, omissions, combinations (e.g., of aspects across various embodiments), adaptations and/or alterations as would be appreciated by those in the art based on the present disclosure. For example, the number and orientation of components shown in the exemplary systems may be modified.

Thus, the foregoing description has been presented for purposes of illustration. It is not exhaustive and is not limiting to the precise forms or embodiments disclosed. Modifications and adaptations will be apparent to those skilled in the art from consideration of the specification and practice of the disclosed embodiments.

The invention claimed is:

1. A system for printing biological materials comprising:
a bioprinter communicatively coupled to a processor and non-transitory memory comprising instructions to control the operation of the bioprinter;
the bioprinter further comprising:
a first cartridge configured to store a cell-laden material;
a second cartridge configured to store a hydrogel;
an electromagnetic radiation (EMR) module configured to emit EMR;
a modified surface configured to receive a deposited material, the modified surface comprising a polydimethylsiloxane (PDMS) coating; and
a dispensing mechanism coupled to the cartridge configured to dispense and distribute the cell-laden material and the hydrogel onto the modified surface, wherein the dispensing mechanism comprises:
an atomizer needle couplable to the second cartridge, and
a brush configured to distribute the deposited material on the modified surface, the brush configured to form a pattern in the deposited material as it is distributed on the modified surface;
wherein the instructions, when executed by the processor, cause the bioprinter to:
dispense, via the dispensing mechanism, the cell-laden material onto the modified surface,
dispense, via the atomizer needle, the hydrogel onto the dispensed cell-laden material up to a predetermined amount, wherein the brush forms the pattern in the hydrogel as it is dispensed, and
cure, via the EMR module, the dispensed cell-laden material and the dispensed hydrogel.

2. The system of claim 1, wherein the PDMS coating has a thickness between about 20 to about 200 µm.

3. The system of claim 1, wherein the modified surface is positioned within a bottom surface of a well of a receiving plate.

4. The system of claim 3, wherein the receiving plate comprises at least one of glass, polystyrene, and polypropylene.

5. The system of claim 1, wherein the PDMS coating comprises at least one of nanoparticle surface modifications, dynamic surfactant treatments, plasma coatings, graft polymer coatings and hydrolyzation surface modifications.

6. The system of claim 1, wherein the hydrogel comprise at least one of collagen, hyaluronic acid, gelatin, fibrin, nanocellulose, alginate, polyethylene glycol (PEG), chitosan, and pluronic.

7. The system of claim 1, wherein the modified surface is sterile.

8. The system of claim 1, wherein the bioprinter is further configured print a cancer tissue model.

* * * * *